United States Patent
Lin et al.

(10) Patent No.: US 8,294,048 B2
(45) Date of Patent: Oct. 23, 2012

(54) METHOD FOR DETERMINING TOUCH SIGNAL GENERATING BY SENSOR STRUCTURE OF TOUCH PANEL

(75) Inventors: Chien-Ming Lin, Kaohsiung (TW); Ming-Ta Hsieh, New Taipei (TW); Chih-Chung Chen, Taichung (TW); Hsueh-Fang Yin, Kaohsiung (TW); Chia-Lin Liu, Taichung (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 0 days.

(21) Appl. No.: 13/467,060

(22) Filed: May 9, 2012

(65) Prior Publication Data

US 2012/0218224 A1  Aug. 30, 2012

Related U.S. Application Data (63) Continuation of application No. 12/566,676, filed on Sep. 25, 2009, now Pat. No. 8,203,538.

(30) Foreign Application Priority Data

Apr. 17, 2009 (TW) .............................. 98112820 A (51) Int. Cl.
*G06F 3/044* (2006.01)

(52) U.S. Cl. ...................... 178/18.06; 345/174; 345/173

(58) Field of Classification Search ........................ None
See application file for complete search history.

(56) References Cited

U.S. PATENT DOCUMENTS

| | | | |
|---|---|---|---|
| 4,686,332 A | 8/1987 | Greanias et al. | |
| 5,189,417 A | 2/1993 | Caldwell | |
| 5,389,556 A | 2/1995 | Rostoker | |
| 5,563,727 A | 10/1996 | Larson | |
| 5,648,661 A | 7/1997 | Rostoker | |
| 5,903,326 A | 5/1999 | Suman | |
| 6,108,438 A | 8/2000 | Bird | |
| 2003/0049925 A1 | 3/2003 | Layman | |
| 2007/0035528 A1 | 2/2007 | Hodge | |
| 2008/0238881 A1 | 10/2008 | Perski | |
| 2009/0002338 A1* | 1/2009 | Kinoshita et al. | 345/174 |
| 2009/0146970 A1 | 6/2009 | Lowles | |
| 2010/0090980 A1 | 4/2010 | Chen | |
| 2010/0128000 A1 | 5/2010 | Lo | |
| 2011/0007020 A1 | 1/2011 | Hong | |

FOREIGN PATENT DOCUMENTS

JP  6130360  5/1994

* cited by examiner

*Primary Examiner* — Van Chow
(74) *Attorney, Agent, or Firm* — Winston Hsu; Scott Margo (57) ABSTRACT

A sensor structure of a touch panel and a method of determining a touch signal generated by the same are disclosed. The sensor structure includes a plurality of sensor lines disposed on a surface of a substrate, and a control circuit electrically connected to the sensor lines. Each of the sensor lines has a plurality of conductive pads and a conductive line electrically connected the conductive pads. The control circuit receives a touch signal from one of the sensor lines. The touch signal is resulting from a touch capacitance generated between a touch and one of the conductive pads of the sensor line. The control circuit calculates the position of the touch based on the touch capacitance. In addition, the touch capacitance generated by a conductive pad close to the control circuit is larger than the touch capacitance generated by another conductive pad further away from the control circuit.

10 Claims, 13 Drawing Sheets

METHOD FOR DETERMINING TOUCH SIGNAL GENERATING BY SENSOR STRUCTURE OF TOUCH PANEL

CROSS REFERENCE TO RELATED APPLICATIONS

This is a continuation application of patent application Ser. No. 12/566,676 filed on Sep. 25, 2009, now allowed.

BACKGROUND OF THE INVENTION

1. Field of the Invention

The present invention is related to a sensor structure of a touch panel and a method of determining touch signal generating by the same, and particularly to a sensor structure of a touch panel having a single-layered sensor structure disposed on a surface of a substrate which is capable of determining the X coordinate and the Y coordinate of a touch.

2. Description of the Prior Art

In order to provide a friendly communication interface between users and computers, touch panels replace the conventional mouse and keyboard that users may interact with the touch panels by a finger or a stylus. The user selects or inputs data by contacting the touch panel, and the location where the user touches the panel is determined by a microprocessor, which calculates the location by processing the touch signal created by the touch on the surface of the touch panel.

Figure 1:
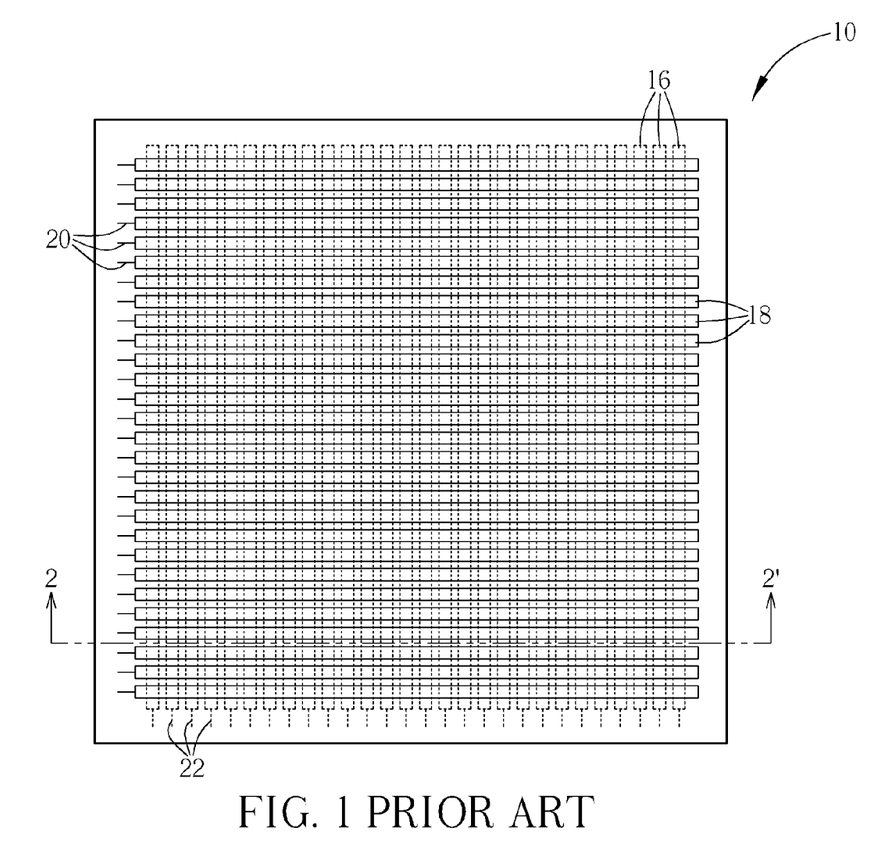
FIG. 1 is schematic diagrams illustrating a conventional sensor structure 10 of a touch panel.
Figure 2:
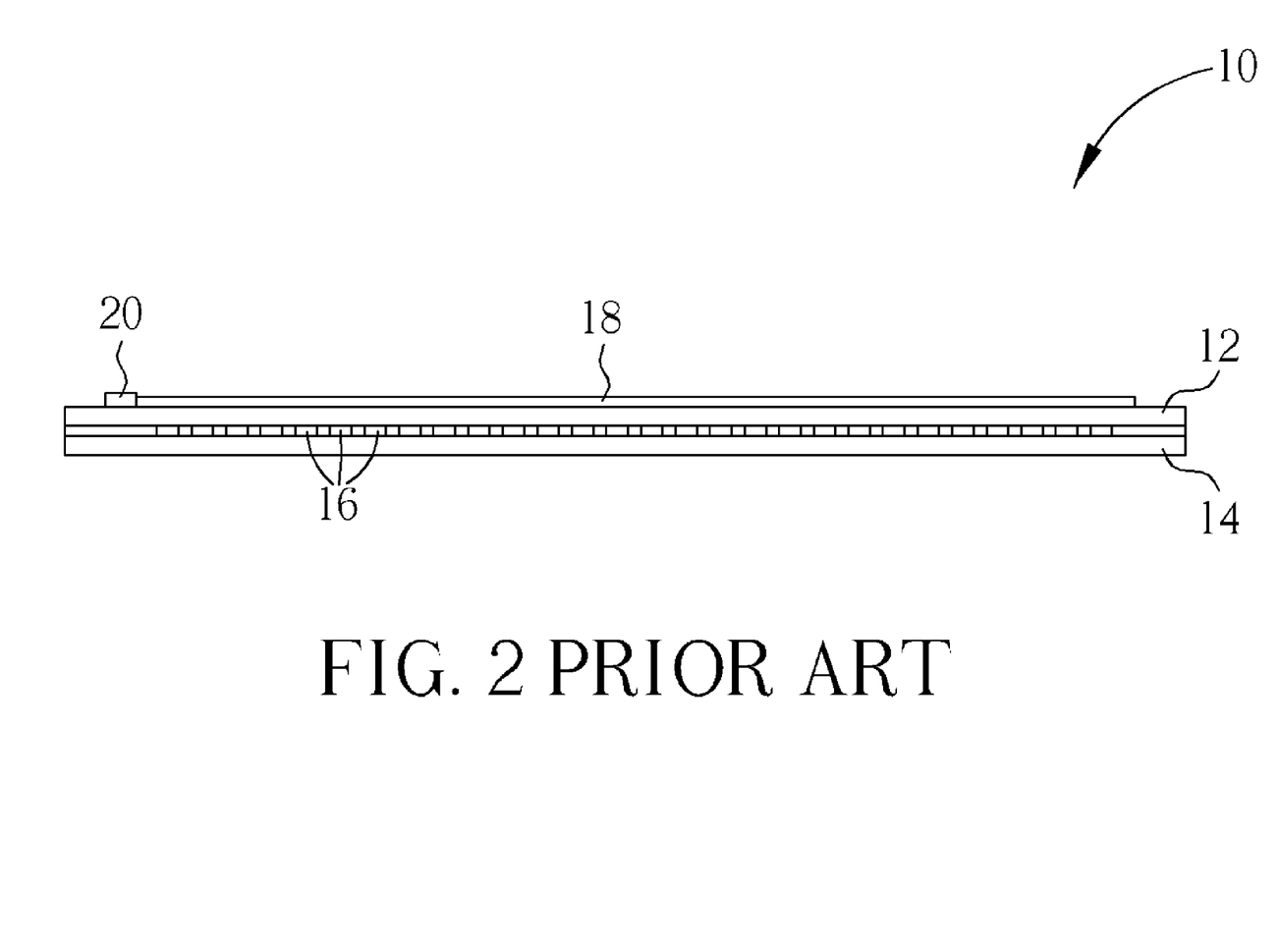
FIG. 2 is a cross-sectional view of the sensor structure 10 taken along the line 2-2' in FIG. 1.

Please refer to FIG. 1 and FIG. 2, which are schematic diagrams illustrating a conventional sensor structure 10 of a touch panel. FIG. 2 is a cross-sectional view of the sensor structure 10 taken along the line 2-2' in FIG. 1. The sensor structure 10 has a first substrate 12, a second substrate 14 disposed under the first substrate 12, a plurality of Y-axis sensor lines 16 positioned between the first substrate 12 and the second substrate 14, and a plurality of X-axis sensor lines 18 disposed on a top surface of the first substrate 12. The sensor structure 10 has a plurality of first inputs/outputs 20 electrically connected to the respective X-axis sensor lines 18, and a plurality of second inputs/outputs 22 electrically connected to the respective Y-axis sensor lines 16. The first inputs/outputs 20 and the second inputs/outputs 22 are electrically connected to a control circuit (not shown). As shown in FIG. 2, the X-axis sensor lines 18 and the Y-axis sensor lines 16 are respectively disposed on the top surface and the bottom surface of the first substrate 12. When a user's finger touches the sensor structure 10, a change in the capacitance of the X-axis sensor lines 18 is generated and is used for determining the X coordinate of the position where the finger touches the sensor structure 10. In addition, a change in the capacitance of the Y-axis sensor lines 16 is generated and is used for determining the Y coordinate of the position where the finger touches the sensor structure 10. According to the capacitance changes in the X-axis sensor lines 18 and in the Y-axis sensor lines 16, the position where the finger touches the sensor structure 10 is confirmed. The sensor structure 10 is made by several processes to form the X-axis sensor lines 18 and the Y-axis sensor lines 16 respectively on the top surface and the bottom surface of the first substrate 12. The more manufacturing processes are performed, the higher the production cost and the higher the difficulties are. In addition, the first input/output 20 connecting to the X-axis sensor lines 18 and the second inputs/outputs 22 connecting to the Y-axis sensor lines 16 have to be formed extending from one end of the Y-axis sensor lines 16 and the X-axis sensor lines 18 which further increases the difficulty of circuit patterning. Therefore, the inputs/outputs of the conventional sensor structure 10 are formed along the X-axis and the Y-axis around the sensor structure 10.

Therefore, the present invention is provided in order to simplify the manufacturing process of the touch panel and to reduce the number of the inputs/outputs disposed around the touch panel.

SUMMARY OF THE INVENTION

A primary objective of the present invention is to determine the X, Y coordinates by a single-layered structure disposed on a surface of a substrate. The sensor structure of the touch panel of the present invention is formed by a minimum number of processes to reduce the production cost.

According to the claimed invention, a method of determining a touch signal generated by a sensor structure of a touch panel is provided. The method includes the following steps:

providing the sensor structure of the touch panel, the sensor structure of the touch panel comprising a plurality of sensor lines disposed on a surface of the substrate, a control circuit electrically connected to the sensor lines, and a passivation layer covering the sensor lines, wherein each of the sensor lines comprising a plurality of conductive pads arranged along a first direction and a conductive line connecting to the conductive pads;

the control circuit receiving a touch signal generating from one of the sensor lines, the touch signal resulting from a touch contacting to one of the conductive pads of said sensor line to generate a touch capacitance and passing the touch signal from said sensor line to the control circuit;

determining the touch signal coming from which one of the sensor lines; and determining the position of the touch depending on the touch capacitance of the touch signal.

These and other objectives of the present invention will no doubt become obvious to those of ordinary skill in the art after reading the following detailed description of the preferred embodiment that is illustrated in the various figures and drawings.

DETAILED DESCRIPTION

In the specification and the claim of the present invention may use a particular word to indicate an element, which may have diversified names named by distinct manufacturers. The present invention distinguishes the element depending on its function rather than its name. The phrase "comprising" used in the specification and the claim is to mean "is inclusive or open-ended but not exclude additional, un-recited elements or method steps." In addition, the phrase "electrically connected to" is to mean any electrical connection in a direct manner or an indirect manner. Therefore, the description of "a first device electrically connected to a second device" is to mean that the first device is connected to the second device directly or by means of connecting through other devices or methods in an indirect manner.

Figure 3:
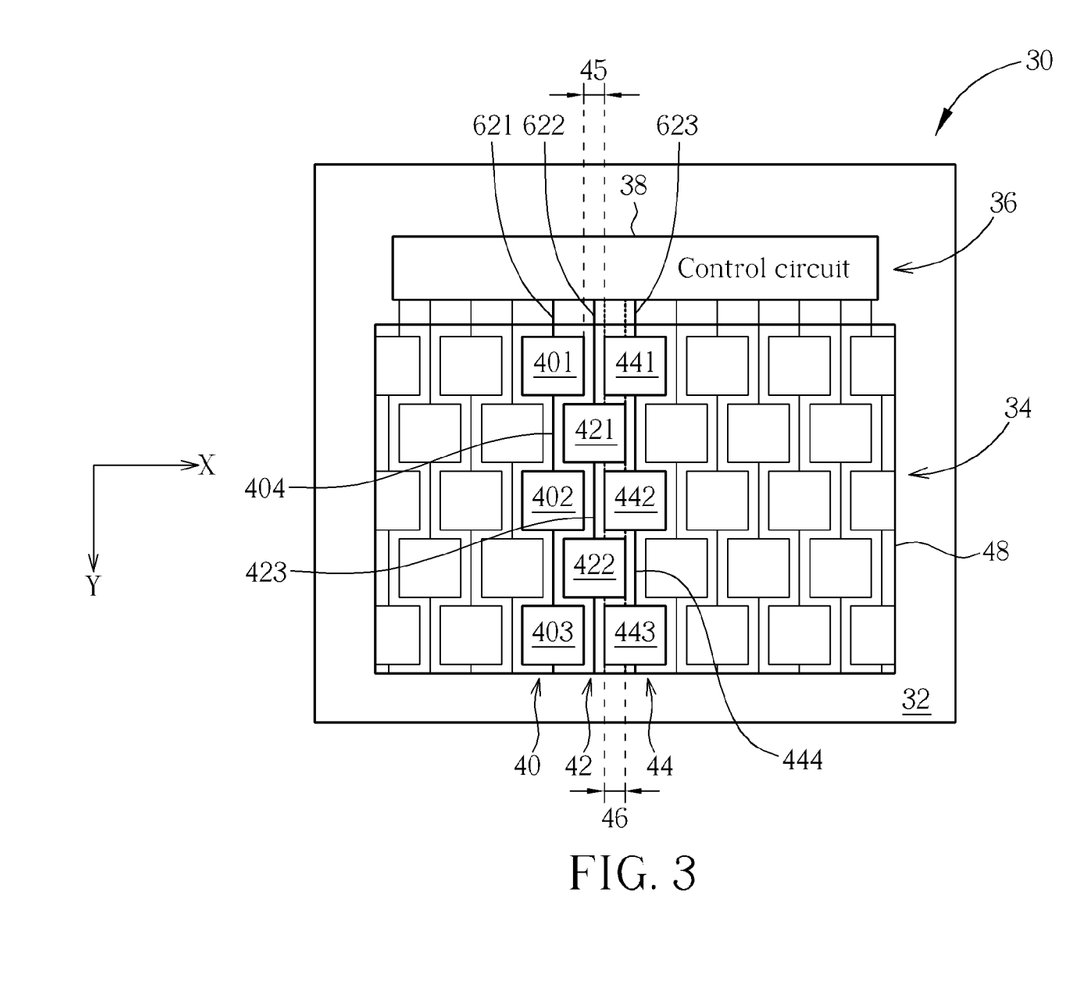
FIG. 3 is a schematic diagram illustrating a sensor structure 30 of a touch panel according to a first preferred embodiment of the present invention.

Please refer to FIG. 3. FIG. 3 is a schematic diagram illustrating a sensor structure 30 of a touch panel according to a first preferred embodiment of the present invention. The sensor structure 30 is disposed in a frame. The sensor structure 30 may be disposed on a display surface on a flat display panel or be incorporated in the flat display panel by the frame, such as a liquid crystal display panel. The sensor structure 30 includes a substrate 32, a sensor region 34, and a circuit region 36. At least a control circuit 38 is disposed in the circuit region 36 to operate signals from the sensor region 34. Other electrical circuits or devices for providing power or signals for operating the sensor structure 30 may be disposed in the circuit region 36. These electrical circuits or devices may be used to operate the signals from the sensor structure 30 and output these signals from the sensor structure 30. As shown in FIG. 3, a plurality of sensor lines is disposed in the sensor region 34. These sensor lines are disposed on a surface of the substrate 32 and electrically connected to the control circuit 38 through the respective inputs/outputs. The sensor lines include a plurality of the conductive pad arranged along the Y-axis (the first direction) and a conductive line connecting to the conductive pads. The conductive line and the conductive pads disposed on the substrate 32 are made of a patterned indium tin oxide (ITO) layer, which is formed by means of forming an ITO layer and a subsequent patterning process. The patterning processes may include steps of forming a patterned photoresist on the ITO layer and performing an etching process to remove the ITO layer exposed by the patterned photoresist to define the pattern of the conductive pads and the conductive line. The conductive pads and the conductive lines may uses indium zinc oxide (IZO) or other transparent conductive material for electrical conduction. For the sake of simplicity, the sensor lines 40, 42, and 44 shown in FIG. 3 are marked in bold lines which are used for the following description. The inputs/outputs 621, 622, 623 are electrically connected between the respective sensor lines 40, 42, 44 and the control circuit 38. The sensor line 40 includes a plurality of conductive pads 401, 402, 403 and a conductive line 404 connecting the conductive pads 401, 402, 403. The sensor line 42 includes a plurality of conductive pads 421, 422 and a conductive line 423 connecting the conductive pads 421, 422. The sensor line 44 includes the conductive pads 441, 442, 443 and the conductive line 444 connecting the conductive pads 441, 442, 443. The conductive pads shown in FIG. 3 are square conductive pads having the same side length. The distance 45 between the adjacent conductive pads, such as the distance between the right edge of the conductive pad 401 to the left edge of the conductive pad 441, is approximately between 0.2 millimeter (mm) and 0.5 mm. The distance 45 between adjacent conductive pads may be modified as required. In addition, the conductive pads 421, 422, 423 of the sensor line 42 and the conductive pads 441, 442, 443 of the adjacent sensor line 44 are staggered in a row. The left edge of the conductive pad 441 is closed to the conductive line 423 between the conductive pad 421 and the control circuit 38. The left edge of the conductive pad 441 does not overlap with the conductive line 423. In addition, the conductive pad 441 and the conductive pad 421 are overlapped along the Y-axis, and the conductive pad 442 and the conductive pad 422 are overlapped along the Y-axis. For easier understanding, an overlapped region 46 is presented in the diagram to show the abovementioned overlapped regions. Moreover, the sensor structure 30 further includes a passivation layer 48 covering the sensor lines, the conductive pads, and the conductive lines. The passivation layer 48 may be a silicon oxide layer or a glass layer which protects the sensor lines or the conductive pads from scrapping during operation.

Figure 4:
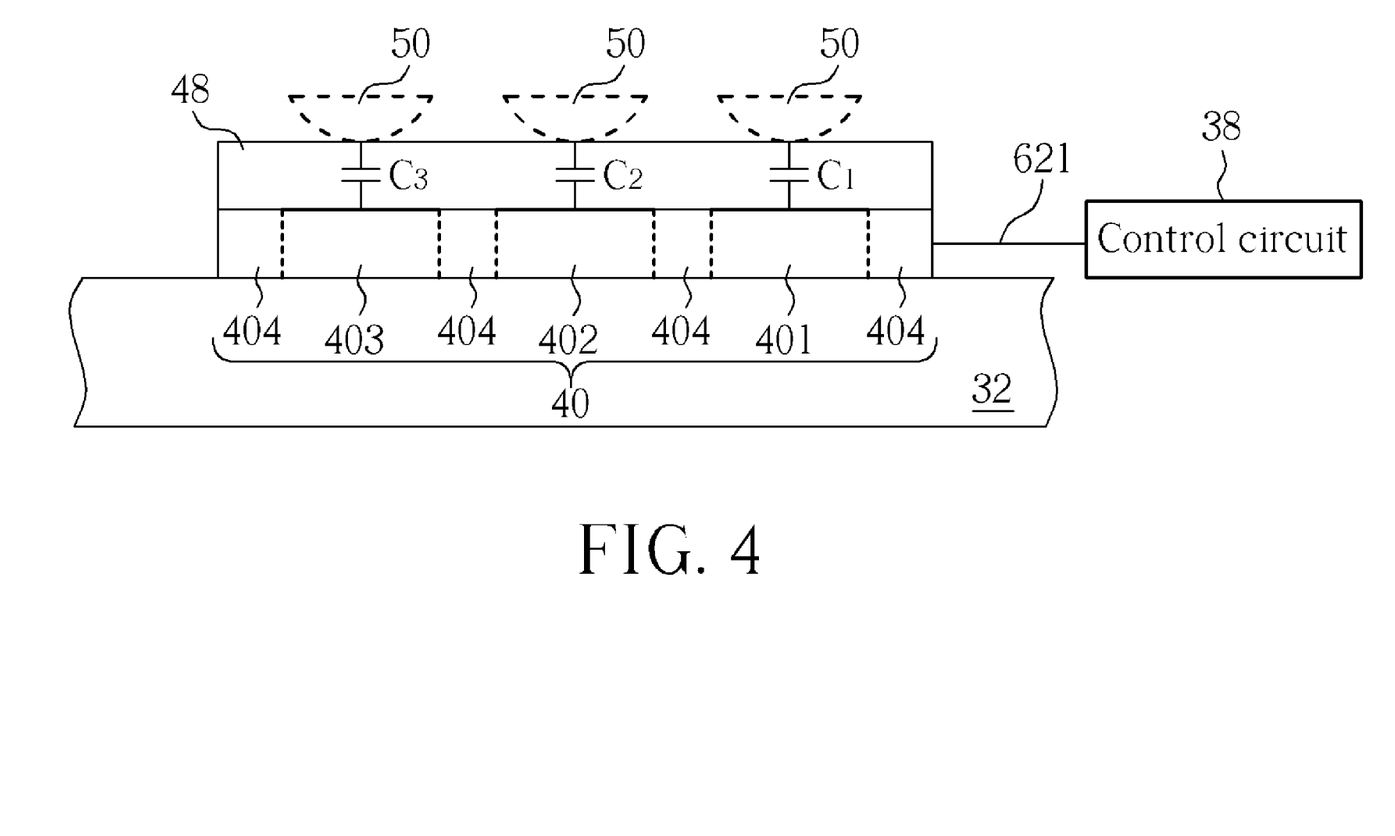
FIG. 4 utilizes the sensor line 40 as an example to show the operating mechanism of the present invention.

Please refer to FIG. 4, which utilizes the sensor line 40 as an example to show the operating mechanism of the present invention. As shown in FIG. 4, the sensor line 40 is disposed on a surface of the substrate 32 and covered by the passivation layer 48. The conductive pads 401, 402, 403 of the sensor line 40 are electrically connected by the conductive line 404. The sensor line 40 is connected to the control circuit 38 through the input/output 621. Users may operate the touch panel by a touch 50, such as a finger, a stylus, or a conductor, touching the passivation layer 48. In the present embodiment, the user touches the passivation layer 48 by his or her finger and a touch capacitance is generated between the touch 50 (the finger) and a respective pad. For instance, when the position of the touch is disposed on: 1) the conductive pad 401, a first touch capacitance $C_1$ is generated between the touch 50 and the conductive pad 401; 2) the conductive pad 402, a second touch capacitance $C_2$ is generated between the touch 50 and the conductive pad 402; or 3) the conductive pad 403, a third touch capacitance $C_3$ is generated between the touch 50 and the conductive pad 403. According to electrical formulas:

$$R_p = \frac{1}{C_p * f}$$

$C_p$ is the touch capacitance;
f is the working frequency of the control circuit 38; and
$R_p$ is the equivalent resistance between the conductive pad and the control circuit.

Since the equivalent resistance between the respective conductive pads 401, 402, 403 of the sensor line 40 and the control circuit 38 is proportional to the distance between the respective conductive pads 401, 402, 403 and the control circuit 38. The equivalent resistance between the conductive pad 403 and the control circuit 38 is greater than the equivalent resistance between the conductive pad 402 and the control circuit 38, in which the conductive pad 403 to the control circuit 38 is further than the conductive pad 402 to the control circuit 38. Similarly, the equivalent resistance between the conductive pad 402 and the control circuit 38 is greater than the equivalent resistance between the conductive pad 401 and the control circuit 38. Therefore, the corresponding touch capacitance triggered by the touch may be calculated. Accordingly, the first touch capacitance $C_1$ is greater than the second touch capacitance $C_2$, and the first touch capacitance $C_2$ is greater than the third touch capacitance $C_3$. The greater the touch capacitance is, the stronger the touch signal that the control circuit 38 receives. Therefore, the control circuit 38 may determine where the position of the touch 50 is depending on the touch signal it receives.

Figure 5:
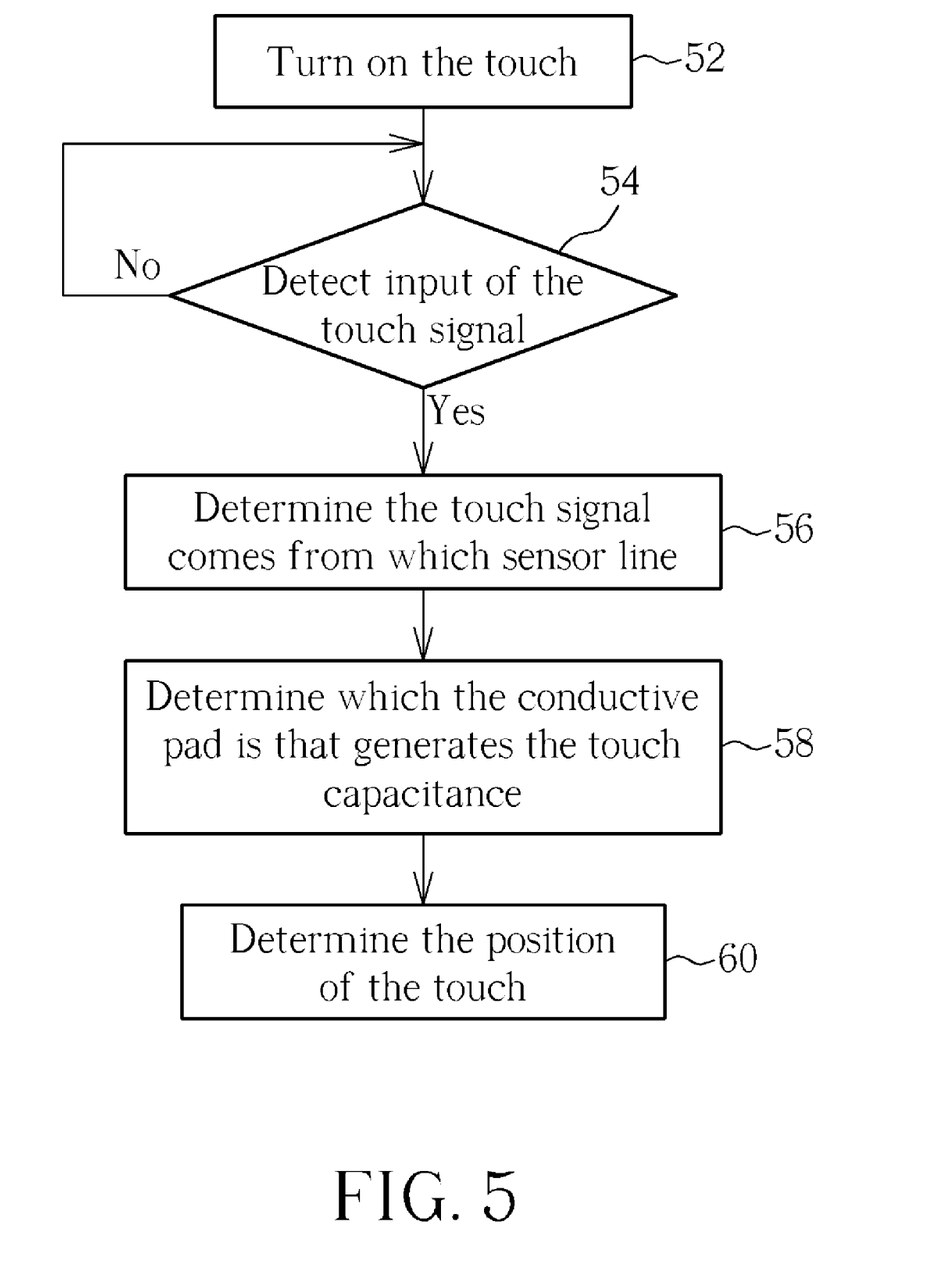
FIG. 5 is a flow diagram showing the method of determining a touch signal of the touch panel.

Please refer to FIG. 5, which is a flow diagram showing the method of determining a touch signal of the touch panel. The method of the present invention includes steps as following.

Step 52: Turn on the touch.

Step 54: Detect input of the touch signal by the control circuit. The touch panel maintain on standby when no the touch signal inputs. The method is proceeded to step 56 when a touch signal inputs.

Step 56: Determine the touch signal comes from which sensor line. For instance, a user may touch the sensor structure by his or her finger for inputting a touch to the touch panel to generate a touch capacitance between one of the conductive pad of the respective sensor line. The touch capacitance results in a touch signal that is passed from said sensor line to the control circuit. Therefore, the control circuit detects which one is said sensor line depending on the incoming touch signal.

Step 58: Determine which conductive pad generates the touch capacitance from the touch capacitance.

Step 60: Determine the position of the touch from the touch capacitance.

Please refer to FIG. 3 in company with FIG. 5. The control circuit determines the Y coordinate of the touch based on the abovementioned method by means of finding out which the sensor line does the touch signal come from. Then, the control circuit determines the X coordinate of the touch based on the touch capacitance. Therefore, the sensor structure of the touch panel of the present invention is simply formed by means of performing a single patterning process on the ITO layer disposed on the substrate to define the pattern of the sensor lines, the conductive pads, and the conductive lines. The position of the touch is determined by means of cooperating the single-layered sensor line with the operation of the control circuit. The manufacturing process for forming conventional touch panel having the X-axis sensor line and the Y-axis sensor line on the respective side of the substrate is no longer required. Therefore, the manufacturing process of forming a touch panel is simplified. In addition, the inputs/outputs connecting to the sensor structure of the present invention are arranged along the X-axis or the Y-axis, rather than being disposed along both of the X-axis and the Y-axis. Therefore, number of the inputs/outputs is substantially reduced. Comparing with the conventional touch panel, the number of the inputs/outputs of the sensor structure of the touch panel of the present invention is 50% less than that of the conventional touch panel. As show in FIG. 3, the inputs/outputs 621, 622, 623 are disposed between the control circuit 38 and the sensor lines 40, 42, 44 along the X-axis.

Figure 6A:
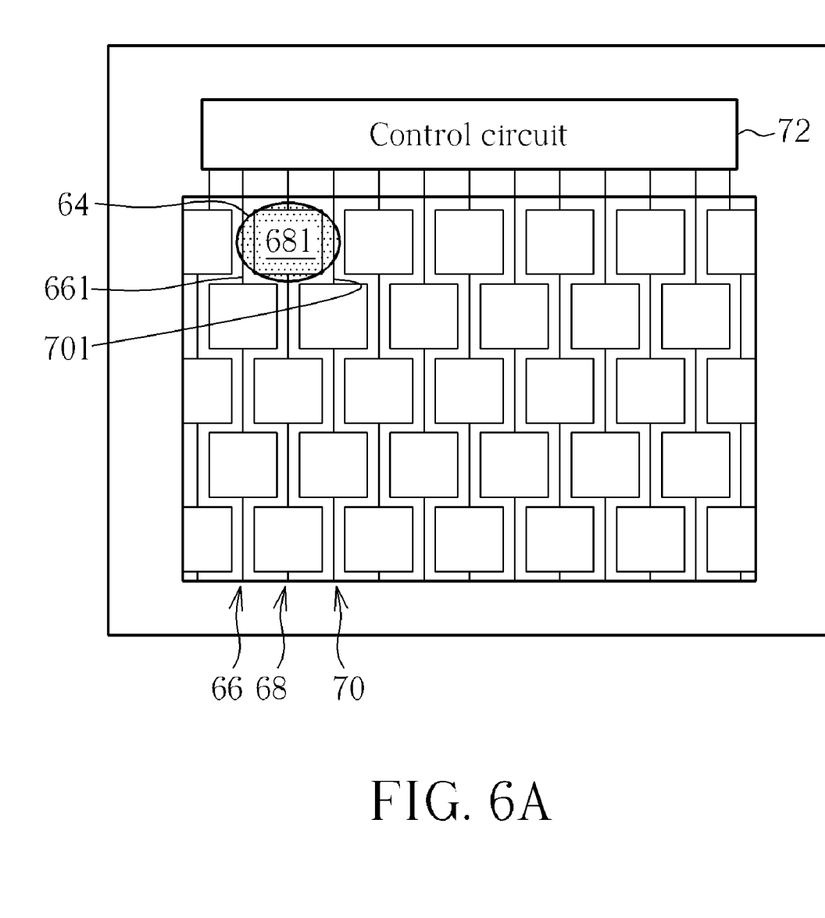
FIGS. 6-8 show several examples for determining the position of the touch by the sensor structure of the touch panel of the present invention.
Figure 6B:
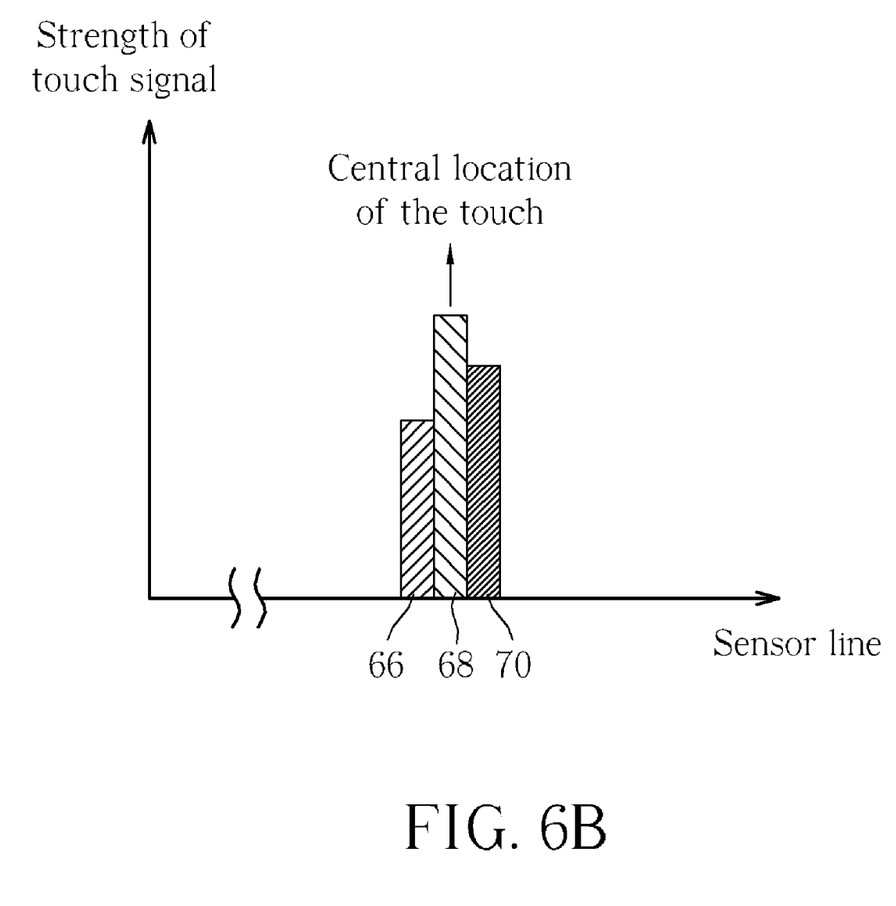
Figure 7A:
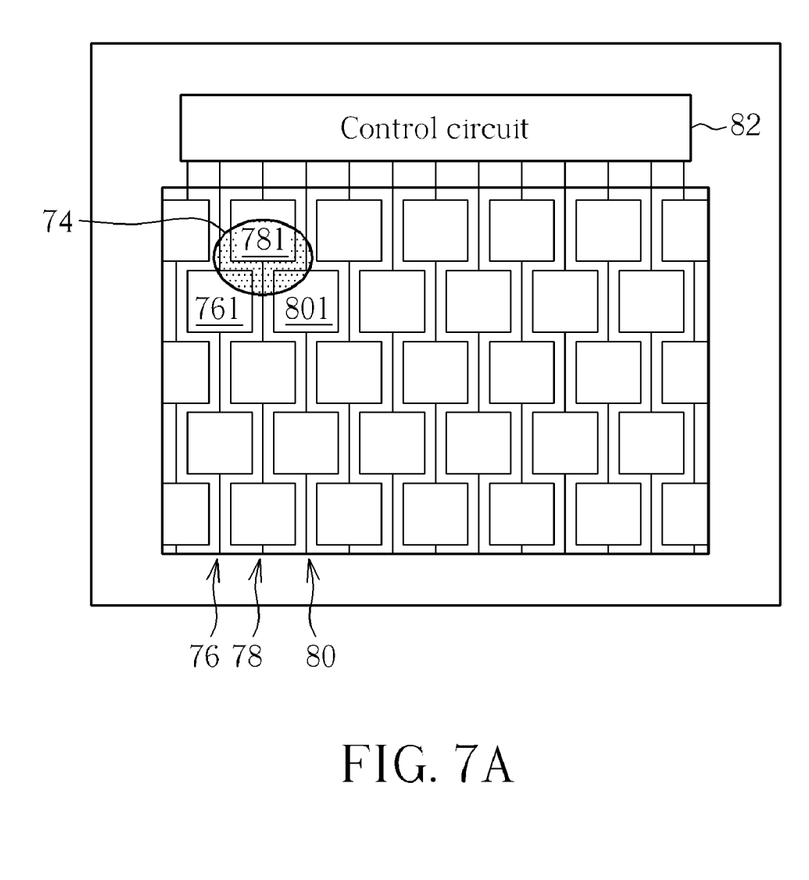
Figure 7B:
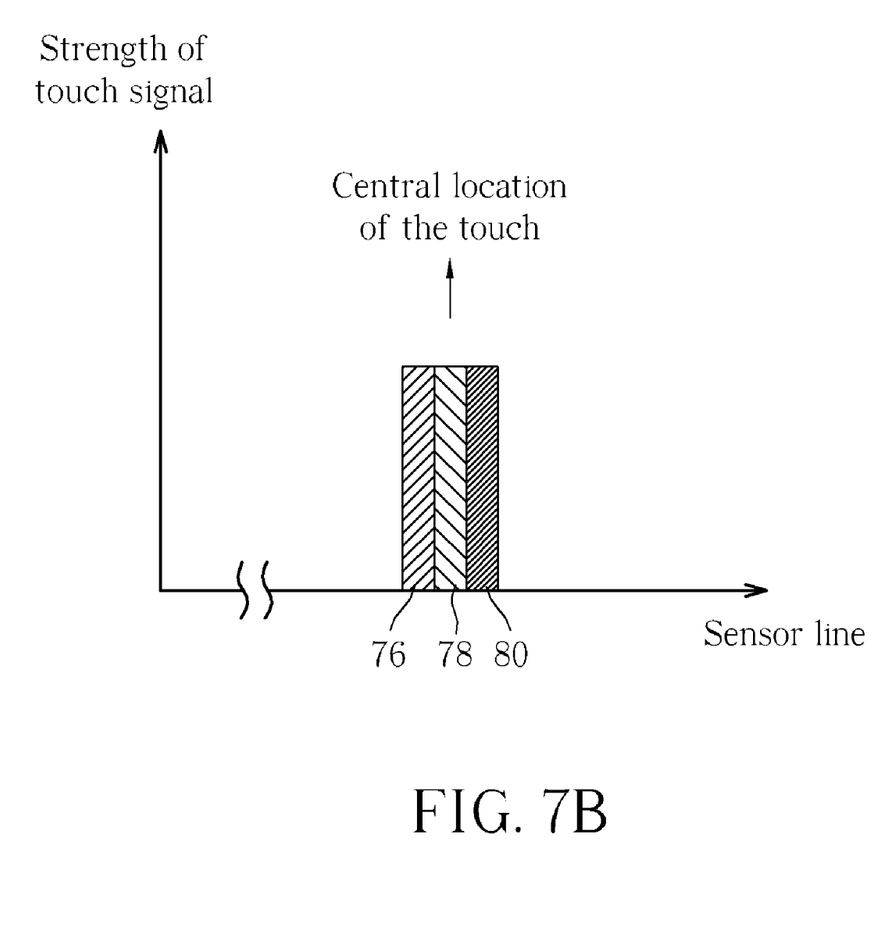
Figure 8A:
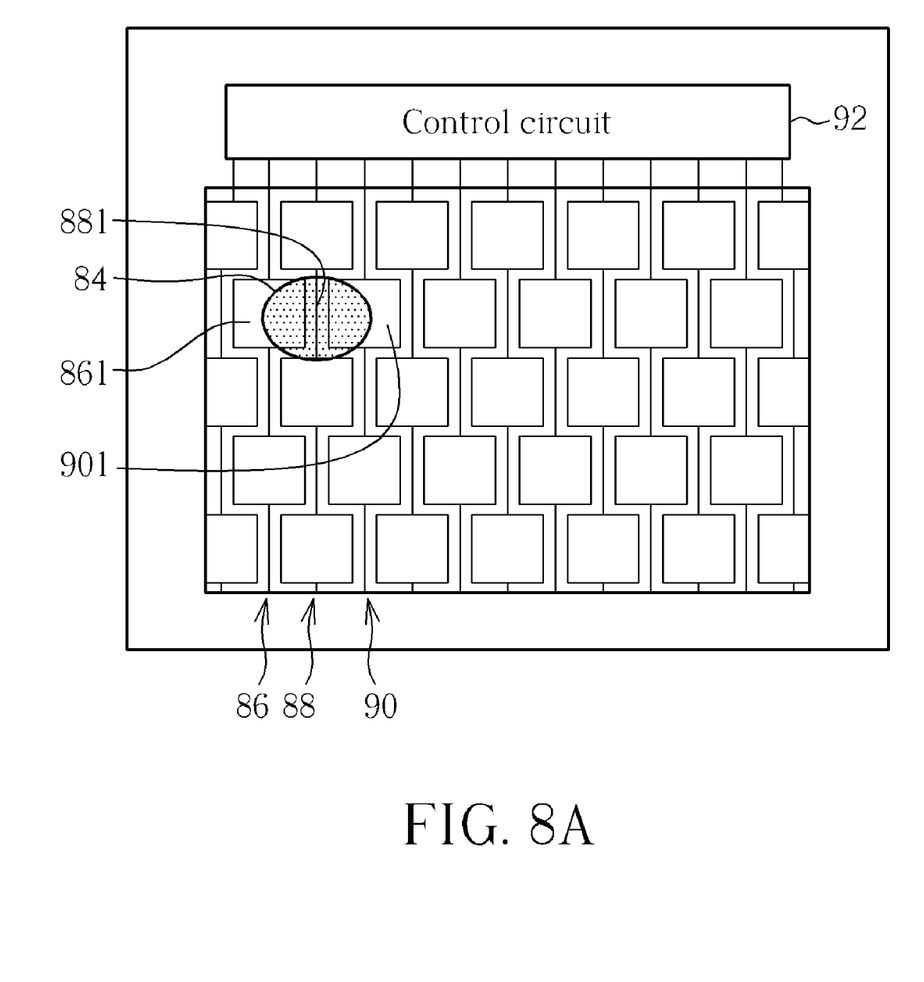
Figure 8B:
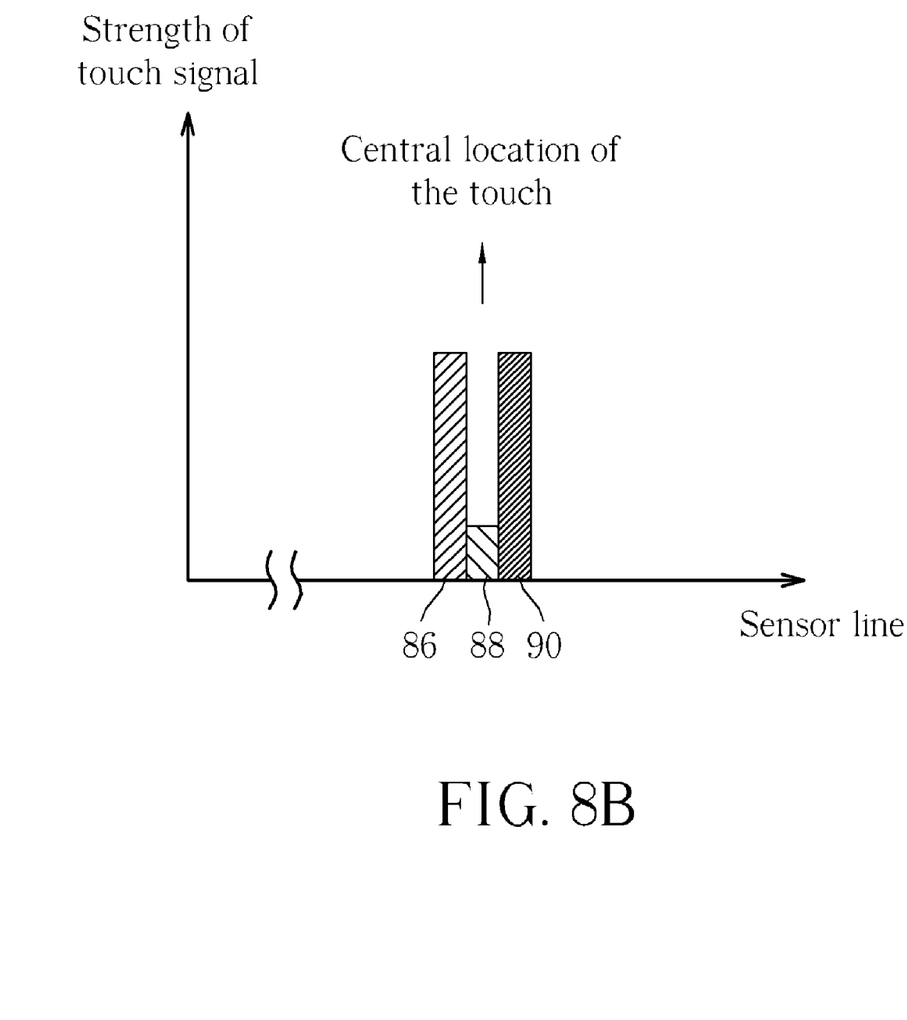

FIGS. 6-8 show several examples for determining the position of the touch by the sensor structure of the touch panel of the present invention. FIG. 6A, FIG. 7A, and FIG. 8A are schematic diagrams illustrating where the touch contacts the sensor structure. FIG. 6B, FIG. 7B, and FIG. 8B are histograms showing the strength of the touch signals passing from the corresponding sensor lines. Please refer to FIG. 6A. The user inputs a touch 64 by his or her finger, and most of contact region of the touch 64 is overlapped with the conductive pad 681 of the sensor line 68. However a small portion of the contact region of the touch 64 is overlapped with the conductive line 661 of the sensor lines 66 and the conductive line 701 of the sensor line 70. The finger used for the touch 64 results in respective touch capacitances with the conductive pad 681, the conductive line 661, and the conductive line 701. The touch capacitance is proportional to the contact area between the finger used for the touch 64 and the conductive pad 681. The sensor lines 66, 68, 70 convert their respective touch capacitances into the respective touch signals and pass these touch signals to the control circuit 72. The greater the touch capacitance is, the stronger the corresponding touch signal. As shown in FIG. 6B, the touch signal coming from the sensor line 68 is the strongest among the touch signals coming from the sensor lines 66, 68, 70. The strength of touch signal coming from the sensor line 70 is in the second place and the touch signal coming from the sensor line 66 is the weakest. According to the strength of the touch signals, the central location of the touch 64 is disposed on the sensor line 68, which has the strongest signal. The central location of the touch 64 may be subsequently determined to be disposed on the conductive pad 681 by means of calculating the value of the touch signal or the corresponding touch capacitance. Please refer to FIG. 7. The contact area of the touch 74 is overlapped with the conductive pads 761 of the sensor line 76, the conductive pads 781 of the sensor line 78, and the conductive pad 801 of the sensor line 80. As shown in FIG. 7B, the touch signals passing to the control circuit 82 have the same strength.

Therefore, the central location of the touch 74 is positioned in a region among the conductive pads 761, 781, and 801. Please refer to FIG. 8. The contact region of the touch 84 is partially overlapped with the conductive pad 861 of the sensor line 86 and the conductive pad 901 of the sensor line 90. The contact region of the touch 84 is overlapped with the conductive line 881 of the sensor line 88 which is disposed between the conductive pads 861 and 901. As shown in FIG. 8B, the control circuit 92 receives the touch signals coming from the sensor line 88 and the sensor line 90 of the same strength. The touch signal coming from the sensor line 88 is the weakest. According to the value of the touch signals, the touch 84 is disposed on the conductive pads 861 or the conductive pads 901. In addition, according to the weak touch signal coming from the sensor line, the central location of the touch 84 is calculated to be disposed on a region overlapping with the conductive pads 861, 901 and the conductive line 881.

Figure 9:
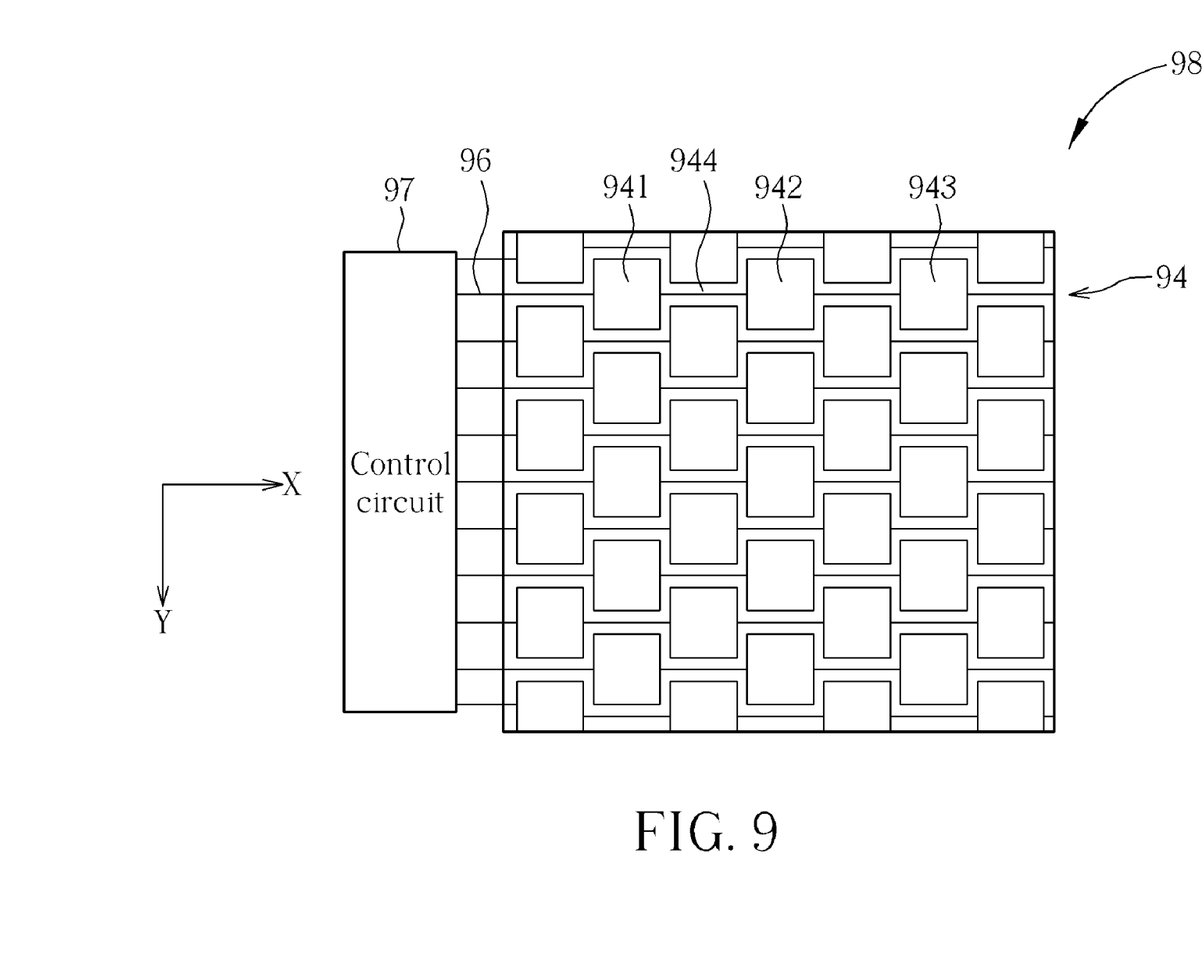
FIG. 9 and FIG. 10 show a second preferred embodiment and a third preferred embodiment of the present invention.
Figure 10:
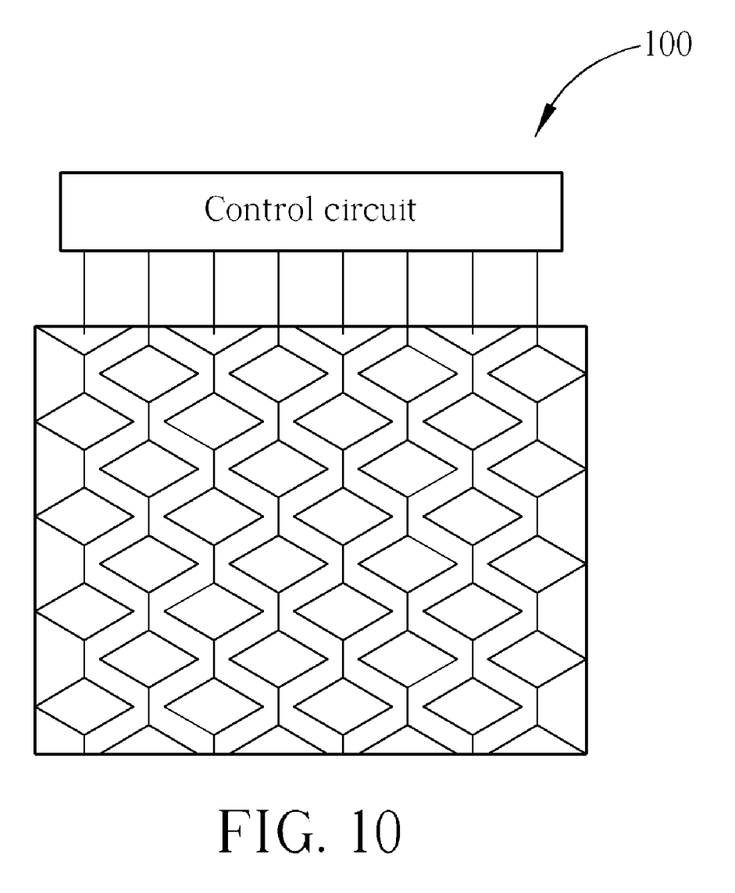

Furthermore, the sensor structure of the touch panel of the present invention is not limited to the first preferred embodiment. FIG. 9 and FIG. 10 show a second preferred embodiment and a third preferred embodiment of the present invention. As shown in FIG. 9, the sensor lines and the corresponding inputs/outputs of the sensor structure 98 are arranged along the X-axis. For instance, the sensor line 94 has plurality of conductive pads 941, 942, 943 arranged along the X-axis and a conductive line 944 electrically connected to the conductive pads 941, 942, 943. The sensor line 94 is electrically connected to a control circuit 97 through an input/output 96 along the X-axis. Please refer to FIG. 10, which shows the third preferred embodiment of the present invention. The sensor structure 100 of the touch panel has diamond conductive pads which are modified from the square conductive pads of the sensor structure 30 shown in the first preferred embodiment. The electric connection and the arrangement of the conductive pads are similar to the first preferred embodiment. However, the shape of the conductive pad is not limited to the square conductive pad or the diamond conductive pad shown in the abovementioned preferred embodiments. The shape of the conductive pads may include triangle, rectangular, parallelogram, polygon, or other configurations which are arranged compactly on the surface of the substrate.

As mentioned above, the sensor structure of the touch panel of the present invention has the sensor lines disposes on a side of the substrate. The X coordinate and the Y coordinate of the touch are determined by where the signal comes from and the value of the touch capacitance generated by the touch. The sensor structure of the touch panel of the present invention not only simplifies the manufacturing process, but also reduces the number of the inputs/outputs. Therefore, the production cost of the touch panel is reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of determining a touch signal generated by a sensor structure of a touch panel, comprising
providing the sensor structure of the touch panel, the sensor structure of the touch panel comprising:
a substrate;
a plurality of sensor lines disposed on a surface of the substrate, each of the sensor lines comprising a plurality of conductive pads arranged along a first direction and a conductive line connecting the conductive pads, wherein any one of the conductive pads of the respective sensor line and another conductive pad of the adjacent sensor line are staggered in a row, and the conductive pads of the aforementioned sensor lines are overlapped in the first direction; and
a control circuit electrically connected to the sensor lines, the control circuit receiving a touch signal generated by one of the conductive pad of the sensor lines, wherein the touch signal is resulting from a touch at one of the conductive pad of the respective sensor line to generate a touch capacitance, and the control circuit determines the position of the touch depending on the touch capacitance, in which the touch capacitance resulting from one of the conductive pad near by the control circuit is greater than the touch capacitance resulting from another conductive pad distant to the control circuit structure of a touch panel, comprising
providing the sensor structure of the touch panel, the sensor structure of the touch panel comprising:
a substrate;
a plurality of sensor lines disposed on a surface of the substrate, each of the sensor lines comprising a plurality of conductive pads arranged along a first direction and a conductive line connecting the conductive pads, wherein any one of the conductive pads of the respective sensor line and another conductive pad of the adjacent sensor line are staggered in a row, and the conductive pads of one of the sensor lines and the conductive pads of the adjacent sensor line are partially overlapped in the first direction; and
a control circuit electrically connected to the sensor lines, the control circuit receiving a touch signal generated by one of the conductive pad of the sensor lines, wherein the touch signal is resulting from a touch at one of the conductive pad of the respective sensor line to generate a touch capacitance, and the control circuit determines the position of the touch depending on the touch capacitance, in which the touch capacitance resulting from one of the conductive pad near by the control circuit is greater than the touch capacitance resulting from another conductive pad distant to the control circuit;
determining the touch signal coming from which one of the sensor lines; and
determining the position of the touch depending on the touch capacitance of the touch signal.

2. The method of claim 1, wherein the conductive pads or the conductive line comprises a transparent conductive material.

3. The method of claim 2, wherein the transparent conductive material comprises ITO, IZO, or combinations thereof.

4. The method of claim 1, wherein each of the conductive pads comprises a square conductive pad.

5. The method of claim 1, wherein each of the conductive pads comprises a diamond conductive pad.

6. A method of determining a touch signal generated by a sensor comprises ITO, IZO, or combinations thereof.

7. The method of claim 6, wherein the conductive pads or the conductive line comprises a transparent conductive material.

8. The method of claim 7, wherein the transparent conductive material
determining the touch signal coming from which one of the sensor lines; and
determining the position of the touch depending on the touch capacitance of the touch signal.

9. The method of claim 6, wherein each of the conductive pads comprises a square conductive pad.

10. The method of claim 6, wherein each of the conductive pads comprises a diamond conductive pad.

* * * * *